3,634,567
METHOD OF STEAM CURING HYDRAULIC SETTING CALCAREOUS CEMENT AND SILICA CONTAINING COMPOSITIONS
Julie Chin-Sun Yang, Somerville, N.J., assignor to Johns-Manville Corporation, New York, N.Y.
No Drawing. Filed Apr. 14, 1969, Ser. No. 816,115
Int. Cl. B28b *3/00;* B29c *25/00;* C04b *15/14*
U.S. Cl. 264—82                                                            14 Claims

ABSTRACT OF THE DISCLOSURE

Method of hydrothermally curing hydraulic cementitious compositions having a binder phase primarily composed of hydraulic setting calcareous cement and silica reactants, comprising a stepwise, two-stage steam curing procedure of subjecting a body of the composition essentially containing the hydraulic setting calcareous cement and silica reactants as the primary source of the binder phase, to an atmosphere of steam applied thereto at two distinct and sequentially increased pressure levels.

BACKGROUND OF THE INVENTION

The hydration curing or setting of hydraulic cement and products composed thereof, has for some years been commonly accelerated by subjecting such materials to steam, both at atmospheric pressure and super-atmospheric pressure conditions. Moreover, in addition to accelerating the setting and thus hastening the attainment of maximum strengths in hydraulic cements and products thereof, the application of steam further enables hydraulic chemical reactions between lime, either provided as such or released by portland type cements during hydration, and silica, with the chemical combining of the lime, silica and water components into compositions comprising high strength bonding gels and hydrated calcium silicate compositions to provide stronger and more resistant materials and products thereof, through the partial utilization of a relatively low cost material—silica—as a reactant which under most hydrothermal steam conditions enters into and contributes to the strength imparting binder matrix rather than simply constituting a substantially inert filler as in cements and/or concretes containing sand or other siliceous materials which are left to cure under atmospheric conditions. Notwithstanding significant and established advantages in accelerated curing and strength, steam or autoclave curing of hydraulic cement materials and products thereof is a costly operation primarily due to the high cost of equipment means therefor, comprising massive autoclaves or pressure vessel structures, and the time necessarily entailed in loading and unloading such units, building up and releasing pressures, purging and the like operations, as well as the requirement of steam producing boilers.

Steam curing of hydraulic cements and products is nevertheless an old art and means, indispensable in the manufacture of premium hydraulic cement products, and wherein strength and durability are high prerequisites, as for example in asbesto-cement pressure pipe, or construction products, especially wherein the mass of the article must be maintained at a minimum due to weight or space considerations.

It is commonly known, and in conformance with general principles relating to the velocities of chemical reactions, that the rate of hydration reactions or curing of hydraulic cement is accelerated with an increase in temperature or thermal energy effected through increased steam pressure. However, apparently because of the intricacies of the reactions and/or interactions of the lime silica-water ternary system, among other possible actively contributing ingredients such as aluminum in typical portland cement compositions, and the significantly influencing effects of the relative proportions of each reactive component (i.e. lime/silica ratio and available water) in relation to temperatures, as well as other possible factors, simply increasing steam pressures and temperatures to accelerate the rate of attaining hydration curing or setting of calcareous hydraulic cements has been found to frequently reduce the ultimate strength of the accelerated cured product in comparison to products cured at a slower rate with lower steam pressures. Additionally, the accelerated cure rates effected by relatively higher pressures has also been found to increase porosity and produce poor gel development, among other degrading characteristics.

SUMMARY OF THE INVENTION

This invention comprises a hydrothermal steam curing, also commonly referred to as autoclaving, procedure and conditions therefor applicable to hydraulic setting calcareous cement-silica components, and materials containing the same, which curing means both expedites the steam curing operation itself in rapidly accelerating the period thereof, and additionally enhances significant strength characteristics of the product so produced. The invention constitutes a method of hydrothermally curing hydraulic cementitious compositions having a binder phase primarily composed of hydraulic setting calcareous cement and silica reactants, such as frequently utilized in the manufacture of common asbestos or other fiber reinforced cement products, including pipe, roofing or siding and other construction sheets or shingles and the like, rod or mesh reinforced structural beams and components etc. The method essentially involves subjecting a body or the product with a composition wherein the primary source of the binder phase consists of hydraulic setting calcareous cement and silica, to an atmosphere of steam which is applied thereto in two distinct and sequential pressure levels with the first of the successive pressure levels being a minimum of 100 p.s.i., followed by an increase to a pressure level of at least 10 p.s.i. over that of the first level.

It is the principal object of this invention to afford means of markedly reducing the time interval for steam curing of compositions including hydraulic setting calcareous cement and silica, in amounts up to about one half the previous term, thereby significantly increasing production capacity without incurring capital expenditures and without degrading the quality of the products so cured, and of additionally substantially enhancing the strength characteristics of such steam cured products, or both commensurately accelerating the steam curing operation reducing the period therefor and increasing the strength of the resulting hydrothermally cured calcareous cement-silica reaction products. And, in addition to the obvious savings attributable to the increased production permitted by the means of this invention with existing equipment, the strength improvements attributable thereto may, on the other hand, permit a reduction in the amount of the relatively expensive reinforcing fiber thereby lowering material cost while retaining the same strength level.

DESCRIPTION OF THE PREFERRED EMBODIMENT

This invention comprises the discovery that in hydrothermally or steam reacting to cure compositions including hydraulic setting calcareous cement and silica, the hydrothermal reactions between the calcareous or lime containing hydraulic cement and silica which constitutes the usual cure or setting reaction mechanisms, can be decidedly accelerated by means which not only overcome any loss in strength in the product but actually improve the strength thereof. The discovered means constitute the application of a stepwise, two stage steam curing procedure of governing and sequentially increasing the level of steam pressure during the hydrothermal curing or autoclaving operation, and specifically includes applying the steam initially at a relatively low pressure of 100 p.s.i. minimum and preferably slightly in excess thereof, followed by a definite increase therein of at least 10 p.s.i.

Specifically, the hydrothermal curing conditions for hydraulic cementitious compositions having a binder phase primarily composed of hydraulic setting calcareous cement, exemplified by portland type cement, and silica or a source of hydrothermally reactive silica, in the two stage procedure of this invention, comprise subjecting such cementitious materials to be hydrothermally cured, to an atmosphere of steam, as in an autoclave or pressure vessel, and applying the steam thereto successively at two distinct and sequentially increased pressure levels with the first of the sequential pressure levels, preferably for most typical conditions, constituting a steam pressure range of approximately 100 to approximately 120 p.s.i., and most expediently about 110 to 115 p.s.i., followed by the second of the sequential pressure levels constituting an increase of at least 10 p.s.i. and for usual conditions within the range of steam pressures of from approximately 125 p.s.i. up to approximately 200 p.s.i., but preferably for practical reasons approximately 125 to approximately 135 p.s.i.

Although the accelerated rate of hydration curing is provided over the entire given range of steam pressures of the second level comprising from approximately 125 up to approximately 200 p.s.i., the strength characteristics of the products steam cured pursuant to this invention appear to peak with optimum steam pressure levels for the second stage of either within the range of 125 to 135 p.s.i., or within the range of 150 to 200 p.s.i., whereby application of pressures for the second stage within a range intermediate thereof of between 135 to 150 p.s.i., results in a product of minimum strengths for the procedure of the invention.

The time durations for each of the two distinct and sequentially increased pressure levels of the stepwise, two stage steam curing procedure of this invention comprise applying the first of the sequential pressure levels of at least 100 p.s.i. or preferably within the range of 110 to 120 p.s.i., for a period of at least 4 hours and preferably about 5 to about 6 hours, followed by the application of the second of the sequential pressure levels of at least 10 p.s.i. greater and within the approximate range of 125 to 200 p.s.i. for a period of at least 2 hours and preferably about 2.5 or 3 to 4 or 5 hours. In any case, the combined sum of the time periods of exposure to the successively applied two levels of pressure should total approximately 7 hours and typically is of about 8 hours. Longer periods can of course be utilized, but the benefits and possibly further enhanced strength characteristics resulting therefrom are not commensurate with the added cost and time, and defeat one of the principal advantages of the invention of reducing the period of steam curing.

Also, the cementitious materials may be pretreated with steam at lower pressures or at atmospheric pressure, it being necessary only that the combined time of the essential sequentially applied two steam pressure levels be continued a minimum of approximately 7 hours, and preferably for about 8 hours. However, it should be appreciated that the duration of these periods of steam curing treatment depends somewhat upon the mass of the material to be hydrothermally cured and its density, and the total load of the pressure vessel and steam capacity available, among other possible factors relating to their effective application to the overall body.

Overall optimum conditions constituting the expedient minimum pressures and time for curing typical commercial asbestos-cement products, comprise steam pressures of about 115 p.s.i. for approximately 5 hours followed by a steam pressure of about 132 p.s.i. for approximately 3 hours. These given periods for each pressure level include, under normal conditions, autoclave purged time and steam blow down time which generally entails about 1.5 hours and one hour respectively.

The stepwise, two-stage steam curing procedure of this invention can be conducted in any common autoclave or pressure vessel having adequate pressure resistance capacity, which is provided with a source of steam of sufficient pressure and the necessary control means to govern and administer the required steam pressures.

The advantages and improvements of this invention can be further favorably accentuated by the additional utilization in concert therewith, of a water spray upon the hydrating materials during the steam curing operation according to the invention and procedure of U.S. Letters Patent No. 3,327,032 to Adams, which disclosed technique thereof is incorporated herein. Accordingly, the combined means of this invention with that of the water spray technique of the Adams Pat. No. 3,327,032, constitute the most preferred steam curing method since the respective means in concert produce maximum benefits. Concerning the application of water in liquid form according to the Adams patent, although it is preferred that the water spray according to the precepts of the patent be applied substantially throughout the steam curing autoclave operation, the spray should at least be applied intermittently or primarily during the period of effecting the sequential increased pressure levels of this invention.

Alternatively, although less desirable, but if existing steam chamber equipment limitations are restricted thereto, the steam curing procedure of this invention can be carried out with the product of cement and silica, etc., submerged in water pursuant to known techniques of the prior art in lieu of the water spray of Pat. No. 3,327,032.

The following comprise examples illustrating preferred conditions and means for the stepwise, two-stage steam curing procedure of this invention and resulting therefrom a significant reduction in autoclaving time of periods up to about one half of that commonly employed in commercial production, coupled with increases in the strength characteristics of the products so produced over those manufactured by the extended prior commercial conditions.

In these examples, all compositions were based upon a long standing common formulation for commercial asbestos-cement products consisting, a percent by weight, of 20% of asbestos fiber, 50% of portland cement and 30% silica in the form of silex flour. The fibers' principal, if not only function is that of a physical reinforcement, as is well understood in the art.

In certain of the hereinafter examples, the samples evaluated constituted the products of factory produced commercial materials of the foregoing formulation, as is identified therein. The other samples, also identified as such, were formed by admixing the above ingredients in the same given ratios and combining with water by adding 150 grams of the asbestos-cement-silica solids admixture to 1000 milliliters of water, and upon thorough mixing, filter molding the admixture with a vacuum of 16 inches of mercury and then pressing to shape and to consolidate under a pressure of 10,000 p.s.i., all to simulate a conventional asbestos-cement wet forming technique. The samples cut from factory produced articles, or as formed above, including both those comprising standards representing prior art steam curing practices and those selected for treatment pursuant to this invention, were all air cured for either 16 hours or 24 hours, as specified hereinafter, at 100% relative humidity at approximately 23° C. ±2 degrees, prior to steam curing either at a steam pressure level of 100 p.s.i. for 16 hours constituting established commercial production conditions for use as standard, or pursuant to the stepwise, two-stage cure of this invention following the specific condition given in detail in the examples.

Example 1

A number of samples comprising the foregoing standard asbestos-cement composition of 20% asbestos, 50% portland cement and 30% silex flour, were prepared by the aforementioned simulated mixing and forming procedure, in specimen thicknesses of both ¼″ and ½″ thick. All were precured for 24 hours at 100% relative humidity at 23±2° C., immediately prior to subjecting them to either standard autoclaving conditions or that of this invention. These samples were all steam cured under water to simulate water spray conditions which would normally be utilized in factory production. The samples employed as the control standards, were autoclaved pursuant to conventional production conditions of exposure to steam at a substantially constant pressure of 100 p.s.i. for a period of 16 hours. The average flexural strengths MR (p.s.i.) for the control samples were 4940 p.s.i. for the ¼″ samples, and 5460 p.s.i. for the ½″ samples. The comparable strength properties for the samples hydrothermally steam cured pursuant to the stepwise, two-stage technique of this invention were as set forth in the following table. In each case of curing pursuant to this invention, the initial stage of the cure comprised steam curing at a pressure of 115 p.s.i. over a period of 5 hours, followed by an increase for a second period as set forth in the table.

TABLE I

| | Flexural strength [1] MR (p.s.i.) average, sample thickness | |
|---|---|---|
| | ¼ in. | ½ in. |
| First stage, 115 p.s.i., 5 hours | | |
| Second stage: | | |
| 127 p.s.i.: | | |
| 1 hour | 4,770 | 5,940 |
| 3 hours | 5,200 | 6,070 |
| 5 hours | 5,320 | 5,800 |
| 150 p.s.i., 3 hours | 5,100 | 6,030 |

[1] All strength values were corrected to a nominal density value of 89.7 p.c.f. for ¼ in. samples and 95.5 p.c.f. for ½ in. samples. These values are the average densities of the control samples of the respective thicknesses.

It is apparent from the foregoing data that optimum strengths exceeding the control values by more than 5% in some cases were obtained with the stepwise, two-stage steam curing cycle of a total time interval of only approximately one-half that for the control standards comprising typical commercial production conditions.

Example 2

In this example the specimens were autoclaved at higher pressures in the second stage. The samples were prepared in ¼ and ½ thicknesses of the same composition and by the same means as given hereinbefore, and prior to steam curing were air cured likewise for 24 hours at 100% relative humidity at 23±2° C. The specimens utilized as control standards were also steam cured at a steady level of 100 p.s.i. for 16 hours providing an average flexural strength MR of 4940 p.s.i. for the ¼-in. thick specimen, and 5180 p.s.i. for the ½-in. thick specimen. The strength properties for the specimens steam cured at an initial stage of 115 p.s.i. for 5 hours and thereafter at the further elevated pressures and time given are set forth with all data in the following table.

TABLE II

| | Flexural strength [1] MR (p.s.i.) average, sample thickness | |
|---|---|---|
| | ¼ in. | ½ in. |
| First stage, 115 p.s.i. hours | | |
| Second stage: | | |
| 127 p.s.i.: | | |
| 3 hours | 5,200 | 5,240 |
| 5 hours | 5,320 | 5,400 |
| 150 p.s.i., 3 hours | 5,100 | 5,215 |
| 165 p.s.i., 3 hours | 5,516 | |
| 175 p.s.i.: | | |
| 3 hours | 5,140 | |
| 5 hours | 5,230 | |
| 200 p.s.i., 3 hours | 5,290 | |

[1] All strength values were corrected to a nominal value of 89.7 p.c.f.—the average density of the control samples of ¼ in. thickness.

Example 3

Samples for the following test were composed of the same composition but were prepared by adding 200 grams of the above given proportioned admixture of solid materials to 1500 milliliters of water, similarly filtered, but then pressing at a total pressure of 15,000 lbs. consolidating the admixture into specimens of ¼ in. thickness and thereby providing compositions of higher density. These specimens were likewise first air cured in the humidity cabinet for 24 hours at 100% relative humidity and 23±2° C. Flexural strengths of the cured samples were determined according to ASTM C-223-55 method, and the modulus of rupture was computed from the average of four samples. The given MR strength values were all corrected to a nominal value of 97.2 p.c.f., the average density of the ¼-in. control samples. As before, the control samples were hydrothermally reacted and cured at a steady steam pressure of 100 p.s.i. for 16 hours, and the stepwise, two-stage steam curing conditions were as given.

TABLE III

| Curing conditions | Density (p.c.f.) | Flexural strength MR[1] (p.s.i.) average | Percent strength increase |
|---|---|---|---|
| Control samples: | | | |
| 100 p.s.i./16 hr | 97.2 | 5,180 | |
| 127 p.s.i./8.5 hr | 96.1 | 4,820 | −6.95 |
| Stepwise, two stage cure: | | | |
| 115 p.s.i./5 hr.-127 p.s.i./2 hr | 97.2 | 5,450 | +5.2 |
| 115 p.s.i./5.5 hr.-127 p.s.i./3 hr | 95.6 | 5,310 | +2.5 |
| 115 p.s.i./5.5 hr.-132 p.s.i./3 hr | 97.5 | 5,360 | +3.47 |

[1] All strength values were corrected to a nominal value of 97.2 p.c.f.—the average density of the control samples of ¼ in. thickness.

Example 4

In this example the sample specimens were cut from commercially produced asbestos-cement pipe products, and specimens from the same section of pipe were employed both as a standard by hydrothermally reacting and curing them under the usual factory production conditions of a constant steam pressure level of about 100 p.s.i. for 16 hours, and as experimental specimens subjected to the stepwise, two-stage hydrothermal steam curing conditions of this invention. In carrying out the hydrothermal steam curing of this invention a water spray was applied to the material during the autoclaving. The curing conditions and relative strength properties attributable thereto are given in the following table.

TABLE IV

|  | Control | Sample 1 | Sample 2 |
| --- | --- | --- | --- |
| Steam curing interval, total hours | 16 | 8.5 | 7.5 |
| Steam curing conditions: | | | |
| First stage: | | | |
| p.s.i. | 100 | 115 | 115 |
| Hr. | 16 | 5.5 | 5.0 |
| Second stage: | | | |
| P.s.i. | None | 13.2 | 132 |
| Hr. | None | 3.0 | 2.5 |
| Density (p.c.f.) | 110.8 | 111.2 | 110.0 |
| Crush strength MR, p.s.i. | | 8,010 | 7,360 |
| Crush strength of pipe with standard cure, p.s.i. | 8,170 | 7,360 | 6,210 |
| Percent change from control | 0 | +9 | +8 |

NOTE.—All strength values were corrected to a nominal value of 97.2 p.c.f., the average density of the control samples of ¼ in. thickness.

It is accordingly amply demonstrated by these examples and the data derived therefrom, that by means of a stepwise, two-stage steam curing with the given pressure level conditions of this invention, these means enable an acceleration of the rate of steam curing to an extent of reducing the time therefor down to approximately one-half of that of the former steam curing treatment, and without incurring any detrimental effects, and in fact including an actual improvement in the strength of the products thereof of up to about 5 to 10% increased strength.

Without limiting this invention to any theory, it appears from observations and examinations of the various products and their comparison, that the probable curing mechanism attributable to the conditions of the stepwise, two-stage steam curing, entails the enabling initial chemical reaction between the calcium hydroxide liberated from the hydraulic cement, with the silica at a relatively low pressure and temperature conditions of in the order of 100 to 120 p.s.i. whereby gels are formed rather than the higher temperature produced crystalline phases, and thereafter during the second stage, the following higher pressures and temperatures favor the formation of a large quantity of strength contributing calcium silicate gels at a more rapid rate.

The means and conditions of the invention of this application are particularly applicable to the manufacture of common asbestos-cement products typically comprising asbestos fiber reinforced portland cement and silica compositions which constitute the bulk of hydraulic cement products produced which are steam cured. However, the means of this invention, the stepwise, two-stage steam curing operation, and the attributes thereof comprising the acceleration or shortening of the steam curing operation coupled with increased strength of the product, would of course be equally applicable to other hydraulic cement products or articles thereof wherein the increased strength and resistance of steam cured hydraulic cement compositions are desired and where it is practical to autoclave the product. In other words, the only significant condition to this invention is that the cementitious compositions include a calcareous or lime containing hydraulic cement and silica, or source of hydrothermally reactive silica, as the principal binder matrix since the chemical mechanism involved relates to the hydrothermal reactions between lime and silica, or more accurately with the ternary system of $CaO$—$SiO_2$—$H_2O$. Thus, the invention particularly relates to common cementitious compositions which may include high proportions of asbestos, or other fibrous reinforcing material such as glass fiber, wood fiber and similar appropriate inorganic or organic fibrous materials, reinforcing rods and/or mesh of metal, plastic, etc., aggregates as in conventional concrete and assorted fillers and ancillary binders, etc., and essentially a portland or other lime containing or producing hydraulic cement and silica or source of hydrothermally reactive silica as the principal binder phase. Silica or hydrothermally reactive sources of silica comprise quartz, and common sources thereof such as sand or silica flour, as well as diatomaceous earth, fly ash, silica gel, tripoli, clays, blast furnace slag, and the like.

I claim:

1. Method of hydrothermally curing hydraulic cementitious compositions having a binder phase primarily composed of hydraulic setting calcareous cement and silica reactants, comprising subjecting a body of the composition essentially containing the hydraulic setting calcareous cement and silica reactants as the primary source of the binder phase, to an atmosphere of steam applied thereto at two distinct and sequentially increased pressure levels including a minimum steam pressure of about 100 p.s.i. for a period of at least 4 hours, followed by a steam pressure increase of at least 10 p.s.i. for a period of at least 2 hours, and with the combined time interval of the said periods of exposure to both said distinct and sequentially increased steam pressure levels totaling at least 7 hours.

2. The hydrothermal curing method of claim 1 wherein the steam pressure of the first of said sequential pressure levels is within the range of approximately 110 to approximately 120 p.s.i., and the steam pressure of the second of the said pressure levels is in excess of about 125 p.s.i.

3. The hydrothermal curing method of claim 2 wherein the said body of the composition essentially containing the hydraulic setting calcareous cement and silica reactants is subjected to the first of the said sequential steam pressure levels for a period of approximately 5 to approximately 6 hours, and thereafter to the second of said sequential steam pressure levels for a period of at least about 2.5 hours.

4. The hydrothermal curing method of claim 3 wherein water in liquid form is applied to the said body of the composition essentially containing the hydraulic setting calcareous cement and silica reactants as the primary source of the binder phase at least periodically during the exposure of said body to the steam atmospere.

5. The hydrothermal curing method of claim 1 wherein the steam pressure of the first of the said sequential pressure levels is within the range of approximately 100 to approximately 120 p.s.i., and the steam pressure of the second of the said sequential pressure levels is within the range of approximately 125 to approximately 200 p.s.i.

6. The hydrothermal curing method of claim 5 wherein the said body of the composition essentially containing the hydraulic setting calcareous cement and silica reactants is subjected to the first of the said sequential steam pressure levels for a period of approximately 5 to approximately 6 hours, and thereafter to the second of the said sequential steam pressure levels for a period of approximately 2.5 to approximately 5 hours.

7. The hydrothermal curing method of claim 6 wherein water in liquid from is applied to the said body of the composition essentially containing the hydraulic setting calcareous cement and silica reactants as the primary source of the binder phase at least periodically during the exposure of said body to the steam atmosphere.

8. The hydrothermal curing method of claim 1 wherein the steam pressure of the first of said sequential pressure levels is approximately 110 to approximately 120 p.s.i., and the steam pressure of the second of the said sequential pressure levels is within the range of approximately 125 to approximately 135 p.s.i.

9. The hydrothermal curing method of claim 8 wherein the said body of the composition essentially containing the hydraulic setting calcareous cement and silica reactants is subjected to the first of the said sequential steam pressure levels for a period of approximately 5 hours, and thereafter to the second of the said sequential steam pressure levels for a period within the range of approximately 2.5 to approximately 4 hours.

10. The hydrothermal curing method of claim 9 wherein the water in liquid form is applied to the said body of the composition essentially containing the hydraulic settling calcareous cement and silica reactants as the primary source of the binder phase at least periodically during the exposure of said body to the steam atmosphere.

11. The hydrothermal curing method of claim 1 wherein the steam pressure of the first of the said sequential pressure levels is within the range of approximately 100 to approximately 120 p.s.i., and the steam pressure of the second of said sequential pressure levels is within the range of approximately 150 to approximately 200 p.s.i.

12. The hydrothermal curing method of claim 11 wherein the said body of the composition essentially containing the hydraulic setting calcareous cement and silica reactants is subjected to the first of the said sequential steam pressure levels for a period of approximately 5 to approximately 6 hours, and thereafter to the second of said sequential steam pressure levels for a period of approximately 2.5 to approximately 5 hours.

13. The hydrothermal curing method of claim 12 wherein water in liquid form is applied to the said body of the composition essentially containing the hydraulic settling calcareous cement and silica reactants as the primary source of the binder phase at least periodically during the exposure of said body to the steam atmosphere.

14. The hydrothermal curing method of claim 1 wherein the steam pressure of the first of the sequential pressure levels is approximately 115 p.s.i. and maintained for a period of approximately 5 to approximately 6 hours, and the steam pressure of the second of the said sequential pressure levels is within the range of approximately 125 to approximately 135 p.s.i. and is maintained for a period of approximately 2.5 to approximately 5 hours, and water in liquid form is applied to the said body of the composition essentially containing the hydraulic setting calcareous cement and silica reactants as the primary source of the binder phase at least periodically during the exposure of said body to the steam atmosphere.

References Cited

UNITED STATES PATENTS

| 3,238,279 | 3/1966 | Tarlton et al. | 264—82 |
| 3,327,032 | 6/1967 | Adams | 264—82 |
| 3,231,657 | 1/1966 | Kalousek | 264—333 |
| 1,019,918 | 3/1912 | Reynolds | 25—Curing Digest B |
| 3,505,439 | 11/1966 | Moorhead | 264—333 |
| 2,602,754 | 7/1952 | Abraham | 264—82 |
| 3,144,346 | 8/1964 | Dilnot | 264—333 X |

FOREIGN PATENTS

| 754,470 | 3/1967 | Canada | 264—333 |

ROBERT F. WHITE, Primary Examiner

J. R. THURLOW, Assistant Examiner

U.S. Cl. X.R.

264—234, 333, 345, Digest B